US010532436B2

(12) United States Patent
Giuliano et al.

(10) Patent No.: US 10,532,436 B2
(45) Date of Patent: Jan. 14, 2020

(54) SYSTEM, METHOD AND APPARATUS FOR ALIGNING TUBES OF A HEAT EXCHANGER

(71) Applicant: GENERAL ELECTRIC TECHNOLOGY GMBH, Baden (CH)

(72) Inventors: John Sebastian Giuliano, East Granby, CT (US); Michelle Giglio York, West Hartford, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 226 days.

(21) Appl. No.: 15/176,690

(22) Filed: Jun. 8, 2016

(65) Prior Publication Data

US 2017/0355046 A1 Dec. 14, 2017

(51) Int. Cl.
*B23P 15/26* (2006.01)
*F28D 7/00* (2006.01)
(Continued)

(52) U.S. Cl.
CPC ............... *B23P 15/26* (2013.01); *B66F 3/12* (2013.01); *B66F 3/22* (2013.01); *B66F 7/065* (2013.01);
(Continued)

(58) Field of Classification Search
CPC ...... B60S 9/06; B60S 9/04; B66F 3/12; B66F 7/0658; B66F 7/0666; B66F 3/22;
(Continued)

(56) References Cited

U.S. PATENT DOCUMENTS 2,047,484 A * 7/1936 McBrady ............... B66F 3/12
254/126
3,292,902 A * 12/1966 Lynch ................... B66F 3/12
254/122
(Continued)

FOREIGN PATENT DOCUMENTS

CA 109 058 A 9/1981
CA 2548850 C 1/2007
(Continued)

OTHER PUBLICATIONS

International Search Report and Written Opinion issued in connection with corresponding PCT Application No. PCT/EP2017/062938 dated Oct. 24, 2017.

*Primary Examiner* — Monica S Carter
*Assistant Examiner* — Mahdi H Nejad
(74) *Attorney, Agent, or Firm* — Grogan, Tuccillo & Vanderleeden, LLP

(57) ABSTRACT

An apparatus for aligning tubes of a heat exchanger includes a generally planar body having an insertion end and an actuator end, a first driving member received by the body and extending between the insertion end and the actuator end, the first driving member being movable axially with respect to the body, and a first biasing member operatively connected to the first driving member. The first driving member is actuatable to move the first biasing member between a clearance position in which the first biasing member lays generally flat within respect to the body, and an extended position in which the first biasing member extends generally perpendicular from the body.

16 Claims, 3 Drawing Sheets

(51) Int. Cl.
    *B66F 3/12*           (2006.01)
    *B66F 7/08*           (2006.01)
    *B66F 3/22*           (2006.01)
    *B66F 7/06*           (2006.01)
    *F22B 37/00*         (2006.01)
    *F22B 37/24*         (2006.01)

(52) U.S. Cl.
    CPC .............. *B66F 7/0608* (2013.01); *B66F 7/08* (2013.01); *F22B 37/005* (2013.01); *F22B 37/24* (2013.01); *F28D 7/0066* (2013.01); *Y02E 20/16* (2013.01)

(58) Field of Classification Search
    CPC ...... B66F 7/0608; B66F 7/0691; B66F 7/065; B66F 7/08; B23P 15/26; F28D 7/0066; B23K 37/056
    USPC ................ 254/424, 419, 98, 93 R, 415, 400, 254/120–126
    See application file for complete search history.

(56) References Cited

U.S. PATENT DOCUMENTS

| | | | | | |
|---|---|---|---|---|---|
| 3,337,170 | A | * | 8/1967 | Remy | B60S 9/04 254/126 |
| 3,645,501 | A | * | 2/1972 | Musgrove | B66F 3/12 254/126 |
| 3,931,895 | A | * | 1/1976 | Grimaldo | B60P 3/07 414/678 |
| 4,405,116 | A | * | 9/1983 | Eisenberg | B66F 7/0608 182/141 |
| 4,854,421 | A | * | 8/1989 | Kawada | B66F 7/0666 187/211 |
| 5,129,776 | A | * | 7/1992 | Peng | B66F 3/22 414/228 |
| 5,450,928 | A | * | 9/1995 | Isogai | B66F 7/0691 187/205 |
| 6,059,263 | A | * | 5/2000 | Otema | B66F 7/0691 254/10 R |
| 6,651,775 | B2 | * | 11/2003 | Bassett, Jr. | B66F 11/042 182/69.5 |
| 6,889,887 | B1 | | 5/2005 | Reeson | |
| 7,318,385 | B2 | * | 1/2008 | Derner | B63C 3/06 114/44 |
| 7,552,616 | B2 | * | 6/2009 | Liu | G01M 7/08 254/122 |
| 2005/0133310 | A1 | * | 6/2005 | Putnam | B66F 7/0641 187/211 |
| 2006/0048925 | A1 | | 3/2006 | Wanni et al. | |
| 2006/0180403 | A1 | * | 8/2006 | Hanlon | B66B 9/0815 187/269 |
| 2007/0160420 | A1 | * | 7/2007 | Aoki | E01F 15/006 404/6 |
| 2007/0210498 | A1 | | 9/2007 | McClure | |
| 2007/0296133 | A1 | | 12/2007 | McClure | |
| 2008/0060909 | A1 | * | 3/2008 | DeVries | B65G 15/00 198/300 |
| 2010/0325797 | A1 | * | 12/2010 | Horne | A61G 13/06 5/611 |
| 2012/0304466 | A1 | | 12/2012 | Wepfer | |
| 2016/0039647 | A1 | * | 2/2016 | Katerberg | B66F 7/20 254/93 L |

FOREIGN PATENT DOCUMENTS

| | | | |
|---|---|---|---|
| DE | 206506 | * | 6/1940 |
| DE | 1020100027889 | * | 10/2011 |
| GB | 685848 A | | 1/1953 |
| WO | 2012038625 A1 | | 3/2012 |

* cited by examiner

SYSTEM, METHOD AND APPARATUS FOR ALIGNING TUBES OF A HEAT EXCHANGER

BACKGROUND

Technical Field

Embodiments of the invention relate generally to heat exchangers and, more particularly, to a system, method and apparatus for aligning heat exchanger tubes of a tube bundle of a heat recovery steam generator.

Discussion of Art

Heat recovery steam generators are of common use in combined cycle power plants. A combined cycle power plant uses more than one thermodynamic cycle to produce power. The heat discharged from one thermodynamic cycle is used as the total or partial heat input for another (bottom) thermodynamic cycle. For example, in a gas-steam combined cycle power plant, the hot exhaust gases of a gas turbine are used to generate steam in a heat recovery steam generator (HRSG) feeding a steam turbine. The HRSG may operate at one or more pressure levels for a better exploitation of the heat made available by the exhaust gases.

Existing HRSGs typically have one or more finned tube bundles to exchange heat from a heat source fluid to water or steam passing through the tube bundles. A plurality of tube bundles may operate at different pressures, e.g. forming an economizer, high and low pressure evaporators and a superheater. The water or steam flows inside the tube bundles exposed to the heat source fluid which, as stated above, may be the exhaust combustion gases of a gas turbine.

Each tube bundle includes a plurality of parallel and narrowly-spaced tubes that extend across a heat source fluid (e.g., gas) flow path. In certain applications, the tubes may be staggered. As is known in the art, the tubes may be held in place utilizing tube restraints and baffles. Over time, however, such restraints and baffles may degrade or become compromised, and the tubes within the bundles may become bowed or misaligned. Currently, there is no easy way of replacing the restraints and/or baffles and realigning the tubes due to the tight spacing between the tubes.

In view of the above, there is a need for an apparatus for realigning the heat exchanger tubes of a heat recovery steam generator that have become misaligned during operation, so that tube restraints and/or baffles may be replaced.

BRIEF DESCRIPTION

In an embodiment, an apparatus for aligning tubes of a heat exchanger is provided. The apparatus includes a generally planar body having an insertion end and an actuator end, a first driving member received by the body and extending between the insertion end and the actuator end, the first driving member being movable axially with respect to the body, and a first biasing member operatively connected to the first driving member. The first driving member is actuatable to move the first biasing member between a clearance position in which the first biasing member lays generally flat within respect to the body, and an extended position in which the first biasing member extends generally perpendicular from the body.

In another embodiment, a method of aligning tubes of a heat exchanger is provided. The method includes the steps of providing an apparatus having a generally planar body having an insertion end and an actuator end, a first driving member received by the body and extending between the insertion end and the actuator end, the first driving member being movable axially with respect to the body, a second driving member received by the body and extending between the insertion end and the actuator end, the second driving member being movable axially with respect to the body, a first biasing member operatively connected to the first driving member, and a second biasing member operatively connected to the second driving member, inserting the insertion end of the apparatus between rows of tubes of a heat exchanger, and actuating the first driving member and the second driving member to extend the first and second biasing members, respectively. The first and second biasing members are configured to contact one of the tubes of the heat exchanger to align the tube.

In yet another embodiment, a system for aligning tubes of a heat exchanger is provided. The system includes a tube bundle including a plurality of rows of heat exchanger tubes, and an alignment apparatus received between two rows of the heat exchanger tubes. The alignment apparatus includes a generally planar body having an insertion end and an actuator end, a first window formed in the body between the insertion end and the actuator end, a first longitudinal bore extending through the body from the actuator end towards the insertion end, a first driving member received within first longitudinal bore and extending through the first window, the first driving member being movable axially within the first longitudinal bore, and a first biasing member received within the first window and operatively connected to the first driving member. The first driving member is actuatable to move the first biasing member between a clearance position in which the first biasing member lays flat within the first window and is generally coplanar with a surface of the body, and an extended position in which the first biasing member extends generally perpendicular from the body.

DRAWINGS

The present invention will be better understood from reading the following description of non-limiting embodiments, with reference to the attached drawings, wherein below:

DETAILED DESCRIPTION

Figure 1:
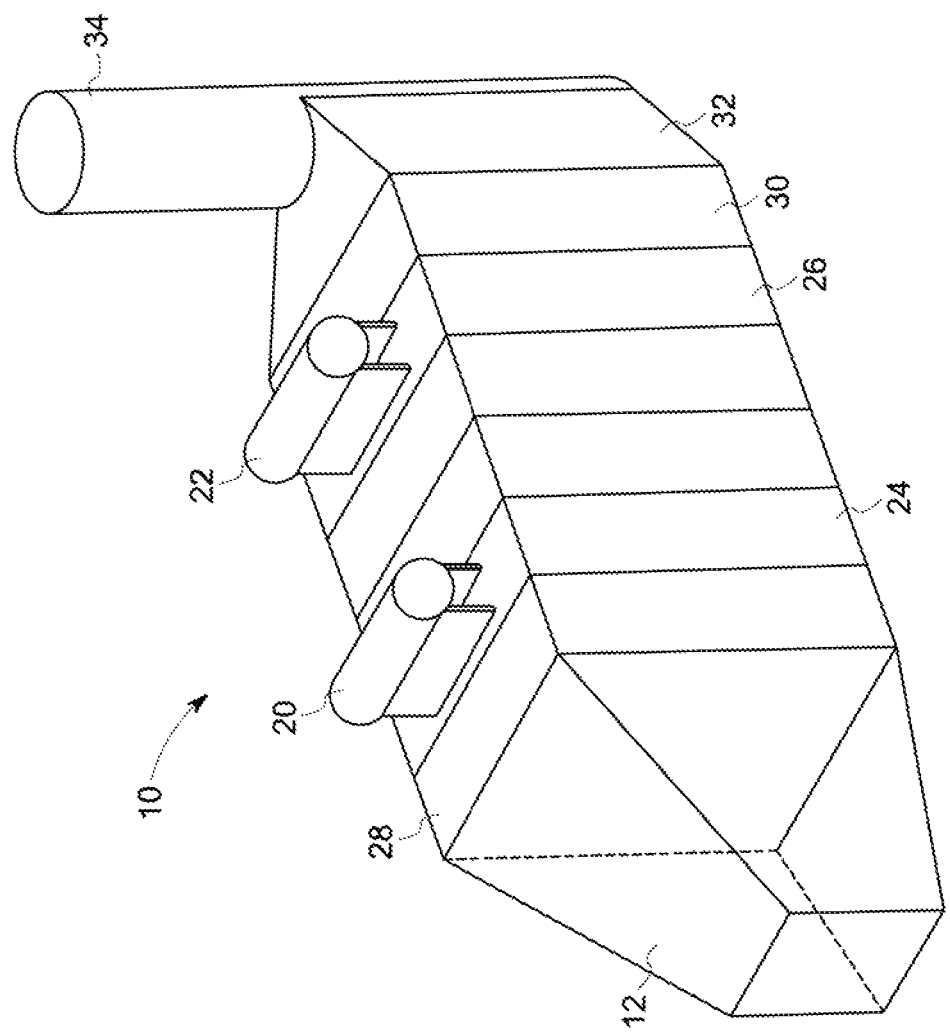
FIG. 1 is a schematic illustration of an exemplary heat recovery steam generator.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for aligning heat exchanger tubes within the tube bundles of a heat recovery steam generator of a combined cycle or cogeneration power plant employing gas turbines, embodiments of the invention may also be applicable for use in aligning or straightening the heat exchanger tubes of any type of heat exchanger in almost any application.

As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

With reference to FIG. 1, an exemplary heat recovery steam generator ("HRSG") 10 with which the apparatus of the invention may be utilized is shown. The HRSG 10 has an inlet plenum 12 which is supplied with combustion/ exhaust gas from an exhaust duct of a gas turbine which powers a generator (not shown). HRSG 10 may be of any known design and includes, for example, a high pressure drum 20, a low pressure drum 22, and associated heat exchanger surfaces including high and low pressure evaporators 24, 26, respectively, superheater 28, and economizer 30 surfaces in a conventional manner. After passing through the heat exchangers, the exhaust gases are directed through a transition piece 32 and are emitted to atmosphere via stack 34, as is known in the art. While the HRSG 10 is illustrated as a dual pressure HRSG having high pressure and low pressure sections, the invention is equally applicable to HRSGs having any number of pressure sections including, for example, a triple pressure HRSG having three pressure sections (i.e. a high pressure section, a low pressure section and an intermediate pressure section).

Each pressure section of the HRSG 10 is configured to transfer energy from the exhaust gas passing therethrough to a feedwater supply to make superheated steam to drive a steam turbine. More specifically, the evaporators or boiler sections (e.g., evaporators 24, 26) function to vaporize water and produce steam. The evaporators may include a bank of finned tubes which extend into the exhaust path from steam drums located at the top of the HRSG 10. Boiler feedwater is supplied to the steam drum(s) at an appropriate pressure, and circulates through the finned tubes of the evaporator. The circulating water absorbs heat from the gas turbine exhaust 14. The amount of heat absorbed by the water, and the amount of heat released by the exhaust gas to generate steam is a product of the mass flow rate of the exhaust gas, the average gas specific heat capacity, the temperature difference across the evaporator, and the surface are of the finned tubes.

The economizers (e.g., economizer 30) are typically installed downstream of the evaporators with which they are associated and function to further lower the temperature of the exhaust gas. Economizers are, similar to the evaporators, finned-tube gas-to-water heat exchangers and, in addition to lowering the temperature of exhaust gas, function to preheat the feedwater prior to its entry into the steam drums associated with the evaporators.

The superheater 28 is located upstream of the associated evaporator and functions to add sensible heat to dry steam produced by the evaporator and steam drum, superheating it beyond the saturation temperature for use by the steam turbine. In an embodiment, the superheater may include either a single heat exchanger module or multiple heat exchanger modules.

Figure 2:
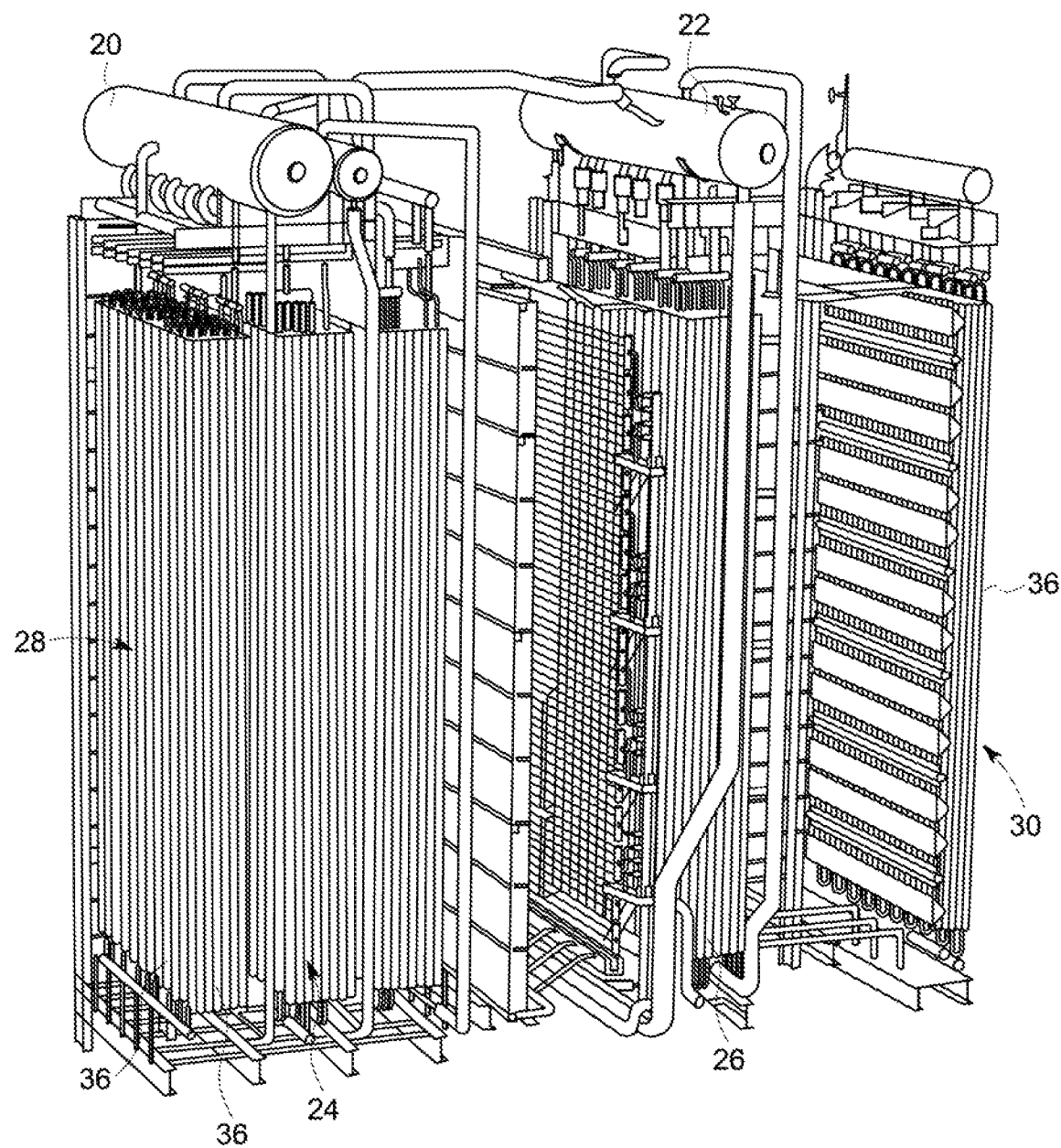
FIG. 2 is a perspective view of a plurality of tube bundles of the heat recovery steam generator of FIG. 1.

FIG. 2 more clearly illustrates the interior of the HRSG 10. As show therein, the heat exchanger surfaces including the high and low pressure evaporators 24, 26, the superheater 28, and the economizer 30 include a plurality of parallel heat exchanger tubes 36 arranged in bundles or banks. As shown, the tubes are substantially parallel and narrowly-spaced relative to one another, and extend substantially vertically. As discussed above, during operation, the tubes 36 of the bundles may become misaligned or bowed, which can lead to damage affecting the overall performance and efficiency of the HRSG 10. Realigning the tubes 36 and replacing any damaged or ineffective restraints or baffles is very challenging due to the tight spacing between the tubes 36.

Figure 3:
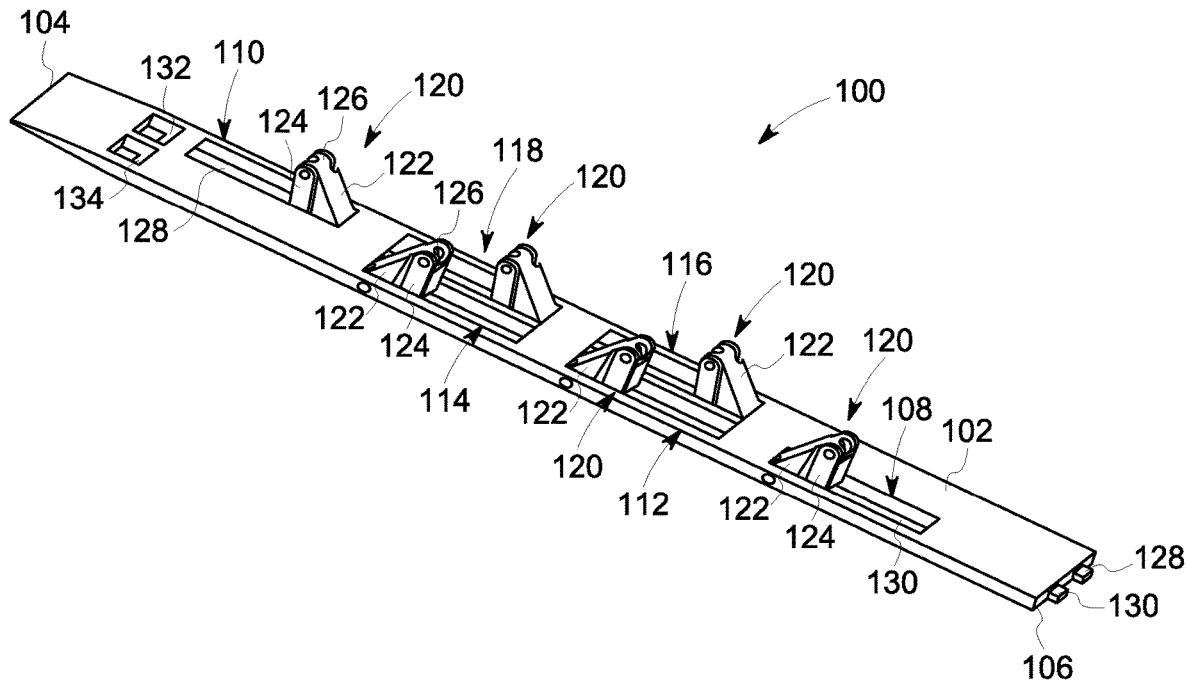
FIG. 3 is a perspective view of an apparatus for aligning tubes of a heat exchanger, according to an embodiment of the invention.
Figure 4:
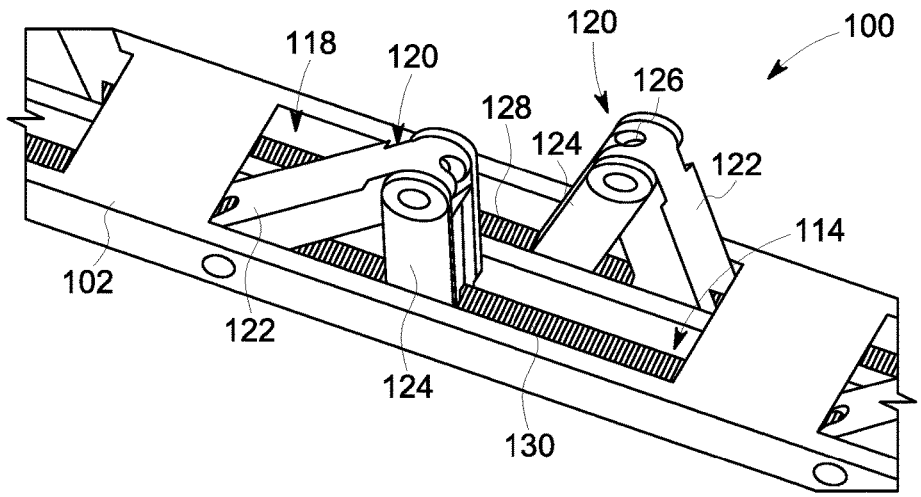
FIG. 4 is an enlarged, perspective view of a portion of the apparatus of FIG. 3.

With reference to FIGS. 3 and 4, an apparatus 100 for aligning tubes of a heat exchanger, e.g., tubes 36 of HRSG 10, is shown. The apparatus 100 includes a generally planar body 102 having an insertion end 104 and an actuator end 106 opposite the insertion end 104. As best shown in FIG. 3, the insertion end 104 is substantially wedge-shaped, which facilitates insertion of the apparatus 100 in the narrow spaces between adjacent heat exchanger tubes of a tube bundle, as discussed hereinafter. In an embodiment, the body 102 is substantially rectangular in shape.

The body 102 includes a plurality of apertures or windows along its length. For example, in an embodiment, the body 102 may include six windows, including a first lower window 108 adjacent to the actuator end 106, a first upper window 110 adjacent to the insertion end 104, second and third lower windows 112, 114 located at a general midpoint along the length of the body 102, and second and third upper windows 116, 118 located above the second and third lower windows 112, 114. As shown in FIG. 3, the windows are generally rectangular in shape, although different configurations are also possible without departing from the broader aspects of the invention.

As further illustrated in FIG. 2, each window includes a biasing member 120 positioned therein. Each biasing member includes a first leg 122 and a second leg 124 pivotally connected to one another at an apex 126, defining an angle therebetween. In an embodiment, the upper ends of the first and second legs 122, 124 may be connected via a pin. A lower end of each first leg 122 is pivotally connected to the body 102 of the apparatus. As shown, the biasing members 120 within the lower windows 108, 112, 114 are pivotally connected to the body 102 at the insertion end of the respective windows within which they are positioned, while the biasing members 120 within the upper windows 110, 116, 118 are pivotally connected to the body 102 at the actuator end of the respective windows within which they are positioned.

As also shown in FIG. 3, a lower end of the second leg 124 of each biasing member 120 is mechanically coupled to a driving member that extends through each of the windows, as discussed in detail hereinafter. In particular, as best shown in FIG. 3, the apparatus 10 further includes upper and lower bores 132, 134 which extend through the body 102 from the actuator end 106 substantially to the insertion end 104. The bores 132, 134 receive upper and lower driving members 128, 130, respectively. In an embodiment, the bores 132, 134 are threaded bores, and the upper and lower driving members 128, 130 are linear screws or threaded rods that are threadedly received by the bores. The driving members 128, 130 are configured to advance or retract within the threaded bores 132, 134 by rotating the driving members 128, 130 in clockwise and counterclockwise directions, respectively. While shown as threaded rods, the driving members may also be hydraulic or pneumatic pistons that are configured to slide axially within the upper and lower bores.

As indicated above, the lower ends of the second legs 124 of each biasing member 120 are operatively and pivotally connected to the driving member 128, 130 (depending on whether it is positioned in an upper or lower window), but are otherwise not restrained by the body 102 of the apparatus 100. In particular, the second legs 124 of each biasing member 120 are operatively connected to one of the driving members 128, 130 such that the lower end of the second leg 124 moves axially/linearly along with the driving member 128, 130 (i.e., it can be urged towards the insertion end 104 or towards the actuator end 106 by the advancement or retraction of the driving member within the bores). The biasing members 120 are each movable between fully upstanding positions, shown in FIGS. 3 and 4, and lie-flat or clearance positions in which the outer surfaces of the legs 122, 124 are substantially coplanar with a top surface of the body 102 such that the legs 122, 124 substantially close off the window within which it is positioned.

In connection with the above, advancement of the driving member 128 within the bore 132 causes the biasing members 120 within the upper windows 110, 116, 118 to transition from their extended positions to their lay-flat/clearance positions. In particular, advancement of the driving member 128 (i.e., from the actuator end 106 towards the insertion end 104) will cause the legs 124 of the biasing members 120 within the upper windows 110, 116, 118 to also move axially towards the insertion end 104 with the driving member 128. This movement causes the second leg 124 to pivot with respect to the first leg 122 about the apex 126, increasing the angle between the first and second legs 122, 124. Continued advancement of driving member 128 causes the angle between the legs to widen and, as the angle widens, the movement of the second leg 124 creates a pulling force on the first leg 122 at its apex end, causing the leg 124 to rotate about its connection point with the body 102. Even further advancement of the driving member 128 causes the biasing members 120 to lay flat within the window. Rotation of the driving member 128 in the reverse direction effects a reverse movement of the upper biasing members 120, causing them to transition from their clearance positions to the extended positions shown in FIGS. 2 and 3.

The biasing members 120 within the lower windows 108, 112, 114 can be moved from their extended positions to their lay-flat/clearance positions by rotating the driving member 130 in the opposite direction. In particular, counterclockwise rotation of the driving member 130 (i.e., from the insertion end 104 towards the actuator end 106) will cause the legs 124 of the biasing members 120 within the lower windows 108, 112, 114 to also move axially towards the actuator end 106 with the driving member 128. In this sense, the connection between the driving member 130 and the second legs 124 of the biasing members 120 essentially 'pulls' the biasing members 120 to their lay-flat positions. This movement causes the second leg 124 to pivot with respect to the first leg 122 about the apex 126, increasing the angle between the first and second legs 122, 124. Continued retraction of driving member 130 causes the angle between the legs to widen and, as the angle widens, the movement of the second leg 124 creates a pulling force on the first leg 122 at its apex end, causing the leg 124 to rotate about its connection point with the body 102. Even further retraction of the driving member 130 causes the biasing members 120 to lay flat within the lower windows 108, 112, 114. Rotation of the driving member 130 in the reverse direction (i.e., clockwise) effects a reverse movement of the lower biasing members 120, causing them to transition from their clearance positions to the extended positions shown in FIGS. 3 and 4.

In an embodiment, one of the driving members 128, 130 and respective bores 132, 134 may be reverse threaded, so that clockwise rotation of both driving members 128, 130 causes a corresponding advancement of the driving member within the bore.

In operation, when straightening or alignment of heat exchanger tubes is desired, such when replacing tube restraints and/or baffles, the driving members 128, 130 are actuated to move the biasing members 120 to their lay-flat/clearance positions. In this position, the apparatus 10 has a narrow cross-section. The wedge-shaped insertion end 104 is then inserted between rows of tubes, with the upper surface of the body 102 facing the row of tubes which are to be aligned or straightened. The apparatus 100 is then urged into the tube bundle until the tubes to be aligned are positioned in registration with the windows in the body 102. The driving members 128, 130 may then be actuated to move the biasing members 120 to their extended positions. In particular, the driving members 128, 130 may be actuated from the actuator end 106, outside the tube bundle, in order to extend the biasing members 120 from their windows. As they move towards their extended positions, they contact the tubes that are misaligned and urge such tube towards a straightened position.

As illustrated in FIG. 3, in the extended position, the second leg members 124 extend substantially perpendicular from the body 102. The upper and lower biasing members 120 of, for example, upper window 116 and lower window 112 define a space therebetween in which a heat exchanger tube is received. The spacing between the second legs 124 of the biasing members 120 of such windows defines the extent to which the tubes may be aligned. For example, if the spacing is configured to be approximately as wide as a heat exchanger tube, a substantial extent of biasing can be achieved to move the tube to its fully straight orientation.

The process described above may be repeated separately for each misaligned heat exchanger tube. In other embodiments, multiple apparatuses 100 may be utilized to simultaneously straighten a plurality of tubes. The apparatus 100 of the present invention therefore provides a cost effective and easy means to align heat exchanger tubes of a heat exchanger so that tube restraints may be replaced. In particular, tubes of a heat exchanger may easily be urged into position and/or straightened by exerting a lateral force on the tubes with the biasing members (which are themselves controlled by manipulating the driving members from outside the tube bundle). Moreover, by providing the apparatus 100 with a substantially thin body, with biasing members that are movable to a clearance position, and with a wedge-shaped end, the apparatus 100 may be easily inserted into narrow spaces between adjacent rows of tubes. The apparatus 100 therefore provides a level of access into the interior of the tube bundles that has heretofore not been possible. In addition, by providing a second set of windows (i.e., the upper and lower windows 118, 124), tubes within multiple rows may be aligned simultaneously.

In an embodiment, an apparatus for aligning tubes of a heat exchanger is provided. The apparatus includes a generally planar body having an insertion end and an actuator end, a first driving member received by the body and extending between the insertion end and the actuator end, the first driving member being movable axially with respect to the body, and a first biasing member operatively connected to the first driving member. The first driving member is actuatable to move the first biasing member between a clearance position in which the first biasing member lays generally flat within respect to the body, and an extended position in which the first biasing member extends generally perpendicular from the body. In an embodiment, the apparatus includes a first window formed in the body between the insertion end and the actuator end, and a first longitudinal bore extending through the body from the actuator end towards the insertion end, wherein the first driving member is received within the first longitudinal bore and extends through the first window, wherein the first driving member is movable axially within the first longitudinal bore, and wherein in the clearance position, the first biasing member lays generally flat within the first window. In an embodiment, the apparatus may also include a second window formed in the body between the insertion end and the actuator end, and positioned generally below the first window, a second longitudinal bore extending through the body from the actuator end towards the insertion end, a second driving member received within second longitudinal bore and extending through the second window, the second driving member being movable axially within the second longitudinal bore, and a second biasing member received within the second window and operatively connected to the second driving member. The second driving member is actuatable to move the second biasing member between a clearance position in which the second biasing member lays flat within the second window and is generally coplanar with the surface of the body, and an extended position in which the second biasing member extends generally perpendicular from the body. In an embodiment, the first biasing member and the second biasing member each include a first leg and a second leg. The first leg is pivotally connected at one end to the body and at the other end to the second leg. The second leg is operatively connected the first or second driving member with which the biasing member is associated. In an embodiment, the first driving member and the second driving member are threaded rods. In an embodiment, one of the first driving member and the second driving member is reverse-threaded. In an embodiment, the first driving member and the second driving member include at least one of a hydraulic or pneumatic piston. In an embodiment, the first leg of the first biasing member is pivotally connected to the body at an actuator end of the first window, and the first leg of the second biasing member is pivotally connected to the body at an insertion end of the first window. In an embodiment, the second leg of the first biasing member and the second leg of the second biasing member define a channel therebetween configured to receive a tube of a heat exchanger. In an embodiment, the insertion end of the body is generally wedge-shaped. In an embodiment, the apparatus may also include a third window formed in the body between the insertion end and the actuator end, and positioned laterally adjacent to the first window, a third biasing member received within the third window and operatively connected to the first driving member that extends through the third window, a fourth window formed in the body between the insertion end and the actuator end, and positioned laterally adjacent to the second window and generally below the third window, a fourth biasing member received within the fourth window and operatively connected to the first driving member that extends through the fourth window, and a respective biasing member positioned within third window and the fourth window.

In another embodiment, a method of aligning tubes of a heat exchanger is provided. The method includes the steps of providing an apparatus having a generally planar body having an insertion end and an actuator end, a first driving member received by the body and extending between the insertion end and the actuator end, the first driving member being movable axially with respect to the body, a second driving member received by the body and extending between the insertion end and the actuator end, the second driving member being movable axially with respect to the body, a first biasing member operatively connected to the first driving member, and a second biasing member operatively connected to the second driving member, inserting the insertion end of the apparatus between rows of tubes of a heat exchanger, and actuating the first driving member and the second driving member to extend the first and second biasing members, respectively. The first and second biasing members are configured to contact one of the tubes of the heat exchanger to align the tube. In an embodiment, the apparatus further includes a first window formed in the body between the insertion end and the actuator end, a second window formed in the body between the insertion end and the actuator end and positioned generally below the first window, a first bore extending through the body from the actuator end towards the insertion end and receiving the first driving member, a second bore extending through the body from the actuator end towards the insertion end and receiving the second driving member, wherein the first and second biasing members are received within the first and second windows, respectively. In an embodiment, the first driving member and the second driving member include first and second linear screws. In an embodiment, actuating the first driving member includes rotating the first linear screw in one of a clockwise direction and a counter-clockwise direction, and actuating the second driving member includes rotating the second linear screw in the other of a clockwise direction and a counter-clockwise direction. In an embodiment, the first driving member and the second driving member are pneumatic or hydraulic pistons. In an embodiment, the method may also include the step of, prior to inserting the insertion end, actuating the first driving member and the second driving member to move the biasing members to a clearance position. In the clearance position, the biasing members lay substantially flat within the first and second widows, respectively. In an embodiment, the method may also include the step of replacing a tube restraint for the tubes.

In yet another embodiment, a system for aligning tubes of a heat exchanger is provided. The system includes a tube bundle including a plurality of rows of heat exchanger tubes, and an alignment apparatus received between two rows of the heat exchanger tubes. The alignment apparatus includes a generally planar body having an insertion end and an actuator end, a first window formed in the body between the insertion end and the actuator end, a first longitudinal bore extending through the body from the actuator end towards the insertion end, a first driving member received within first longitudinal bore and extending through the first window, the first driving member being movable axially within the first longitudinal bore, and a first biasing member received within the first window and operatively connected to the first driving member. The first driving member is actuatable to move the first biasing member between a clearance position in which the first biasing member lays flat within the first window and is generally coplanar with a surface of the body, and an extended position in which the first biasing member extends generally perpendicular from the body. In an embodiment, the alignment apparatus may further include a second window formed in the body between the insertion end and the actuator end, and positioned generally below the first window, a second longitudinal bore extending through the body from the actuator end towards the insertion end, a second driving member received within second longitudinal bore and extending through the second window, the second driving member being movable axially within the second longitudinal bore, and a second biasing member received within the second window and operatively connected to the second driving member. The second driving member is actuatable to move the second biasing member between a clearance position in which the second biasing member lays flat within the second window and is generally coplanar with the surface of the body, and an extended position in which the second biasing member extends generally perpendicular from the body. In an embodiment, in the extended position, the first and second biasing members define a channel therebetween, wherein one of the heat exchanger tubes is received within the channel. In an embodiment, the insertion end of the alignment apparatus is wedge-shaped.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system, method, and apparatus without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An apparatus for inserting between and aligning tubes of a heat exchanger, comprising:
   a generally planar body having an insertion end operative to be inserted between adjacent tubes of the heat exchanger, and an actuator end, the body defining a first aperture therethrough between the insertion end and the actuator end;
   a first driving member received by the body and extending between the insertion end and the actuator end, the first driving member being movable axially with respect to the body; and
   a first biasing member coupled to the first driving member;
   wherein the first driving member is actuatable to move the first biasing member between a clearance position in which the first biasing member lays generally flat with respect to the body, and an extended position in which the first biasing member extends generally perpendicular from the body; and
   a first longitudinal bore extending through the body from the actuator end towards the insertion end;
   wherein the first aperture is sized to receive the first biasing member therein;
   wherein the first driving member is received within the first longitudinal bore and extends through the first aperture;
   wherein the first driving member is movable axially within the first longitudinal bore; and
   wherein in the clearance position, the first biasing member lays generally flat within the first aperture;
   a second aperture formed in the body between the insertion end and the actuator end, and positioned generally below the first aperture with respect to a latitudinal axis of the body;
   a second longitudinal bore extending through the body from the actuator end towards the insertion end;
   a second driving member received within second longitudinal bore and extending through the second aperture, the second driving member being movable axially within the second longitudinal bore; and
   a second biasing member received within the second aperture and operatively connected to the second driving member;
   wherein the second driving member is actuatable to move the second biasing member between a clearance position in which the second driving member lays flat within the second aperture and is generally coplanar with the surface of the body, and an extended position in which the second biasing member extends generally perpendicular from the body;
   wherein the first and second biasing members define a first space therebetween configured to receive a first heat exchanger tube.

2. The apparatus of claim 1, wherein:
   the first biasing member and the second biasing member each include a respective first leg and a respective second leg;
   wherein each respective first leg is pivotally connected at one end to the body and at the other end to the respective second leg; and
   wherein each respective second leg is coupled to the first or second driving member with which the biasing member is associated.

3. The apparatus of claim 2, wherein:
the first driving member and the second driving member are threaded rods.

4. The apparatus of claim 3, wherein:
one of the first driving member and the second driving member is reverse-threaded.

5. The apparatus of claim 4, wherein:
the first driving member and the second driving member include at least one of a hydraulic or pneumatic piston.

6. The apparatus of claim 3, wherein:
the first leg of the first biasing member is pivotally connected to the body at an actuator end of the first aperture; and
the first leg of the second biasing member is pivotally connected to the body at an insertion end of the second aperture.

7. The apparatus of claim 1, wherein:
the insertion end of the body is generally wedge-shaped.

8. The apparatus of claim 1, further comprising:
a third aperture formed in the body between the insertion end and the actuator end, and positioned laterally adjacent to the first aperture;
a third biasing member received within the third aperture and operatively connected to the first driving member that extends through the third aperture;
a fourth aperture formed in the body between the insertion end and the actuator end, and positioned laterally adjacent to the second aperture and generally below the third aperture;
a fourth biasing member received within the fourth aperture and operatively connected to the first driving member that extends through the fourth aperture; and
a respective biasing member positioned within the third aperture and the fourth aperture;
wherein the third and fourth biasing members define a second space therebetween configured to receive a second heat exchanger tube.

9. A method of aligning tubes of a heat exchanger, comprising the steps of:
providing an apparatus having:
a generally planar body having an insertion end operative to be inserted between adjacent tubes of the heat exchanger, and an actuator end, the body defining a first aperture therethrough between the insertion end and the actuator end;
a first driving member received by the body and extending between the insertion end and the actuator end, the first driving member being movable axially with respect to the body;
a first biasing member coupled to the first driving member;
a first longitudinal bore extending through the body from the actuator end towards the insertion end, wherein the first aperture is sized to receive the first biasing member therein, the first driving member is received within the first longitudinal bore and extends through the first aperture, the first driving member is moveable axially within the first longitudinal bore, wherein when in a clearance position the first biasing member lays generally flat within the first aperture and when in an extended position the first biasing member extends generally perpendicular from the body;
a second aperture formed in the body between the insertion end and the actuator end, and positioned generally below the first aperture with respect to a latitudinal axis of the body;
a second longitudinal bore extending through the body from the actuator end towards the insertion end;
a second driving member received within the second longitudinal bore and extending through the second aperture, the second driving member being moveable axially within the second longitudinal bore;
a second biasing member received within the second aperture and operatively connected to the second driving member, wherein the second driving member is actuatable to move the second biasing member between a clearance position in which the second driving member lays flat within the second aperture and is generally coplanar with the surface of the body, and an extended position in which the second biasing member extends generally perpendicular from the body, the first and second biasing members defining a first space therebetween configured to receive a first heat exchanger tube;
inserting the insertion end of the apparatus between rows of tubes of the heat exchanger; and
actuating the first driving member and the second driving member to extend the first and second biasing members, respectively;
wherein the first and second biasing members are configured to contact one of the tubes of the heat exchanger to align the tube.

10. The method according to claim 9, wherein:
the first driving member and the second driving member include first and second linear screws.

11. The method according to claim 10, wherein:
actuating the first driving member includes rotating the first linear screw in one of a clockwise direction and a counter-clockwise direction; and
actuating the second driving member includes rotating the second linear screw in the other of a clockwise direction and a counter-clockwise direction.

12. The method according to claim 10, wherein:
the first driving member and the second driving member are pneumatic or hydraulic pistons.

13. The method according to claim 9, further comprising the step of:
prior to inserting the insertion end, actuating the first driving member and the second driving member to move the first and the second biasing members to the clearance position;
wherein in the clearance position, the first and the second biasing members lay substantially flat within the first and second apertures, respectively.

14. The method according to claim 9, further comprising the step of:
replacing a tube restraint for the tubes.

15. A system for aligning tubes of a heat exchanger, comprising:
a tube bundle including a plurality of rows of heat exchanger tubes; and
an alignment apparatus received between two rows of the heat exchanger tubes, the apparatus including:
a generally planar body having an insertion end operative to be inserted between adjacent tubes of the heat exchanger and an actuator end, the body defining a first aperture therethrough between the insertion end and the actuator end;
a first longitudinal bore extending through the body from the actuator end towards the insertion end;

a first driving member received within the first longitudinal bore and extending through the first aperture, the first driving member being movable axially within the first longitudinal bore; and a first biasing member received within the first aperture and coupled to the first driving member;

wherein the first driving member is actuatable to move the first biasing member between a clearance position in which the first biasing member lays flat within the first aperture and is generally coplanar with a surface of the body, and an extended position in which the first biasing member extends generally perpendicular from the body; and wherein the first aperture is sized to receive the first biasing member therein;

the alignment apparatus further including:

a second aperture formed in the body between the insertion end and the actuator end, and positioned generally below the first aperture with respect to a latitudinal axis of the body;

a second longitudinal bore extending through the body from the actuator end towards the insertion end;

a second driving member received within the second longitudinal bore and extending through the second aperture, the second driving member being movable axially within the second longitudinal bore; and a second biasing member received within the second aperture and operatively connected to the second driving member;

wherein the second driving member is actuatable to move the second biasing member between a clearance position in which the second driving member lays flat within the second aperture and is generally coplanar with the surface of the body, and an extended position in which the second biasing member extends generally perpendicular from the body;

wherein the first and second biasing members define a first space therebetween configured to receive a first heat exchanger tube.

16. The system of claim 15, wherein:

the insertion end of the alignment apparatus is wedge-shaped.

* * * * *